US012625402B2

(12) United States Patent
Jung et al.

(10) Patent No.: US 12,625,402 B2
(45) Date of Patent: May 12, 2026

(54) DISPLAY DEVICE

(71) Applicant: LG ELECTRONICS INC., Seoul (KR)

(72) Inventors: Yongmin Jung, Seoul (KR); Minho Kim, Seoul (KR); Seunghwan Shim, Seoul (KR); Dukil Suh, Seoul (KR); Byungwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/871,286

(22) PCT Filed: Sep. 22, 2022

(86) PCT No.: PCT/KR2022/014209
§ 371 (c)(1),
(2) Date: Dec. 3, 2024

(87) PCT Pub. No.: WO2024/063177
PCT Pub. Date: Mar. 28, 2024

(65) Prior Publication Data
US 2025/0355297 A1 Nov. 20, 2025

(51) Int. Cl.
*G02F 1/13357* (2006.01)
*G02F 1/1335* (2006.01)

(52) U.S. Cl.
CPC .. *G02F 1/133608* (2013.01); *G02F 1/133603* (2013.01); *G02F 1/133605* (2013.01); *G02F 1/133607* (2021.01)

(58) Field of Classification Search
CPC ......... G02F 1/133608; G02F 1/133603; G02F 1/133605; G02F 1/133607
See application file for complete search history.

(56) References Cited

U.S. PATENT DOCUMENTS

| | | | |
|---|---|---|---|
| 10,580,346 B2 * | 3/2020 | Kumamoto | F21V 19/00 |
| 2012/0044668 A1 * | 2/2012 | Takeuchi | G02F 1/133603 361/759 |

(Continued)

FOREIGN PATENT DOCUMENTS

| | | |
|---|---|---|
| CN | 101329047 | 12/2008 |
| CN | 202419372 | 9/2012 |

(Continued)

OTHER PUBLICATIONS

Korean Intellectual Property Office Application No. 10-2024-7038425, Office Action dated Apr. 28, 2025, 6 pages.

(Continued)

*Primary Examiner* — Evan P Dzierzynski
(74) *Attorney, Agent, or Firm* — LEE, HONG, DEGERMAN, KANG & WAIMEY

(57) ABSTRACT

A display device is disclosed. The display device according to the present disclosure may comprise: a display panel; a frame coupled to the display panel; a substrate positioned between the display panel and the frame and coupled to the frame; a light source mounted on the substrate; and a reflective sheet positioned on the substrate and including a hole through which light from the light source passes. The substrate may comprise: a first substrate extending to be long; and a second substrate electrically connected to the first substrate. The second substrate may comprise: a first plate extending in a direction crossing a longitudinal direction of the first substrate; a second plate extending in the longitudinal direction of the first plate and spaced apart from the first plate in the longitudinal direction of the first substrate; and a third plate connecting the first plate with the second plate and electrically connected to the first substrate.

11 Claims, 10 Drawing Sheets

(56)     References Cited

U.S. PATENT DOCUMENTS

| 2015/0023001 A1* | 1/2015 | Lee | G02F 1/133603 |
| | | | 362/97.1 |
| 2018/0045877 A1* | 2/2018 | Shimizu | G02F 1/133608 |

FOREIGN PATENT DOCUMENTS

| JP | 2012-018809 | 1/2012 |
| KR | 10-2009-0073458 | 7/2009 |
| KR | 10-2010-0080024 | 7/2010 |
| KR | 10-2010-0092696 | 8/2010 |
| KR | 10-2012-0063153 | 6/2012 |
| KR | 10-1225665 | 1/2013 |
| KR | 10-2019-0016305 | 2/2019 |

OTHER PUBLICATIONS

PCT International Application No. PCT/KR2022/014209, International Search Report dated Jun. 15, 2022, 4 pages.
European Patent Office Application Serial No. 22959610.1, Search Report dated Jul. 4, 2025, 11 pages.

* cited by examiner

FIG. 11

DISPLAY DEVICE

CROSS-REFERENCE TO RELATED APPLICATION

This application is the National Stage filing under 35 U.S.C. 371 of International Application No. PCT/KR2022/014209, filed on Sep. 22, 2022, the contents of which is hereby incorporated by reference herein in its entirety.

TECHNICAL FIELD

The following description relates to a display device.

BACKGROUND ART

With the development of the information society, there have been growing demands for various types of display devices, and in order to meet these demands, various display devices, such as a liquid crystal display (LCD) device, a Plasma Display Panel (PDP), an electroluminescent display (ELD), a vacuum fluorescent display (VFD), an organic light emitting diode (OLED), etc., have been studied and used recently.

Among them, the LCD panel includes a TFT substrate and a color substrate which are positioned opposite each other with a liquid crystal layer interposed therebetween, and displays images by using light provided by a backlight unit.

Recently, many studies are being conducted on the structure of a substrate on which light sources, such as LEDs, are mounted.

DISCLOSURE OF INVENTION

Technical Problem

It is an objective of the present disclosure to solve the above and other problems.

It is another objective of the present disclosure to provide a display device with excellent image quality characteristics.

It is yet another objective of the present disclosure to provide a substrate structure capable of implementing various types of local dimming blocks.

It is still another objective of the present disclosure to provide a display device capable of reducing substrate manufacturing costs.

It is further another objective of the present disclosure to provide a substrate structure capable of increasing a substrate chamfering efficiency.

Solution to Problem

In accordance with an aspect of the present disclosure, the above and other objectives can be accomplished by providing a display device including: a display panel; a frame coupled to the display panel; a substrate disposed between the display panel and the frame and coupled to the frame; a light source mounted on the substrate; and a reflective sheet disposed on the substrate and having a hole through which the light source passes, wherein the substrate includes: a first substrate which is elongated; and a second substrate which is electrically connected to the first substrate, wherein the second substrate includes: a first plate extending in a direction intersecting a longitudinal direction of the first substrate; a second plate extending in the longitudinal direction of the first plate and spaced apart from the first plate in the longitudinal direction of the first plate; and a third plate connecting the first plate and the second plate and electrically connected to the first substrate.

Advantageous Effects of Disclosure

The display device according to the present disclosure has the following effects.

According to at least one of the embodiments of the present disclosure, a display device with excellent image quality characteristics may be provided.

According to at least one of the embodiments of the present disclosure, a substrate structure capable of implementing various types of local dimming blocks may be provided.

According to at least one of the embodiments of the present disclosure, substrate manufacturing costs may be reduced.

According to at least one of the embodiments of the present disclosure, a substrate structure capable of increasing a substrate chamfering efficiency may be provided.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

BRIEF DESCRIPTION OF DRAWINGS

FIGS. 1 to 11 are diagrams illustrating examples of a display device according to embodiments of the present disclosure.

MODE OF DISCLOSURE

Figure 1:
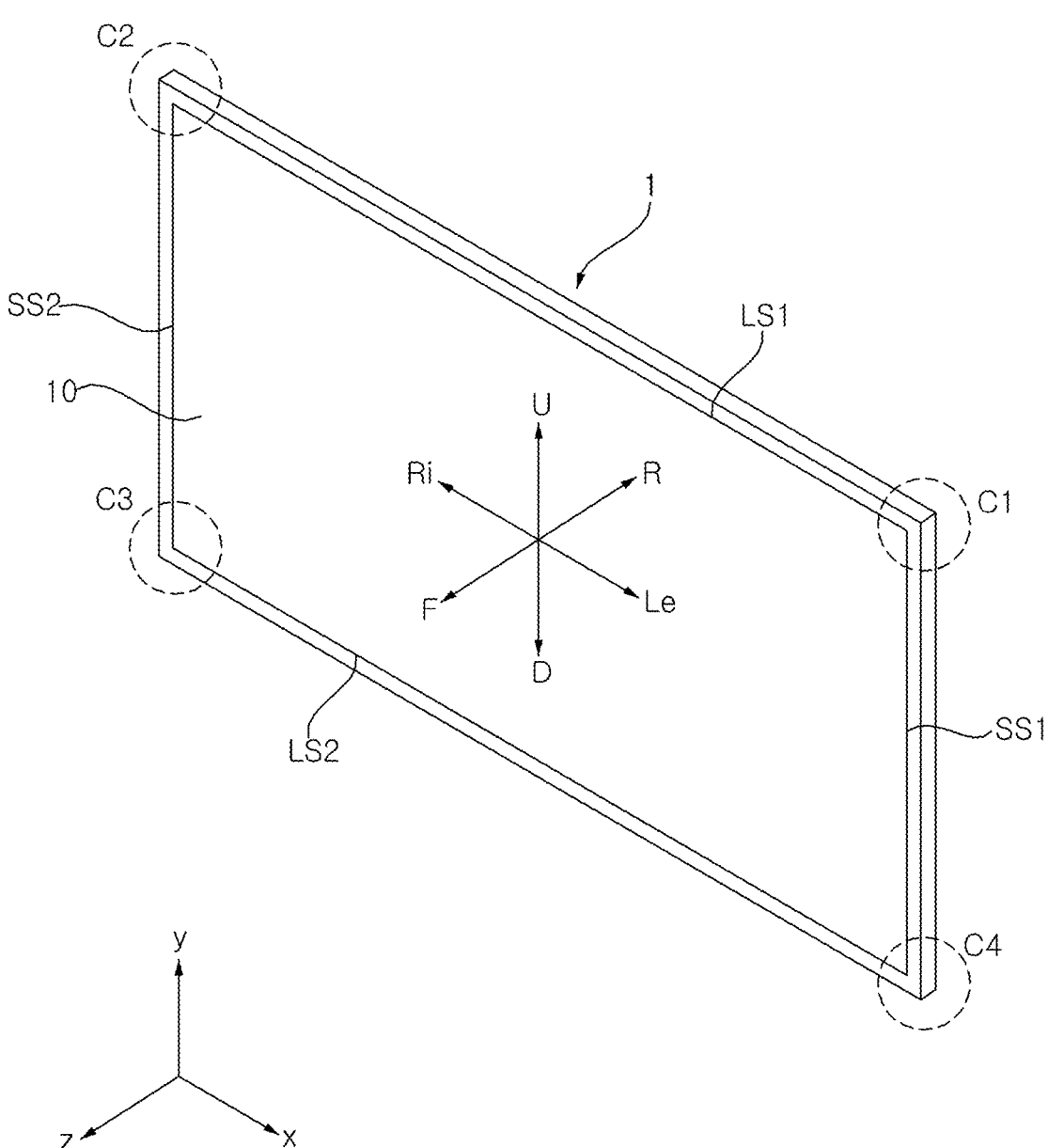

Hereinafter, the present disclosure will be described in detail with reference to the accompanying drawings, in which the same reference numerals are used throughout the drawings to designate the same or similar components, and a redundant description thereof will be omitted.

The suffixes, such as "module" and "unit," for elements used in the following description are given simply in view of the ease of the description, and do not have a distinguishing meaning or role.

In addition, it will be noted that a detailed description of known arts will be omitted if it is determined that the detailed description of the known arts can obscure the embodiments of the present disclosure. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A singular representation may include a plural representation unless context clearly indicates otherwise.

It should be understood that the terms "comprise," "include," "have," etc. when used in this specification, specify the presence of stated features, integers, steps, operations, elements, components, or combinations thereof but do not preclude the presence or addition of one or more other features, integers, steps, operations, elements, components, or combinations thereof.

References to directions, such as up (U), down (D), left (Le), right (Ri), front (F), and rear (R) shown in the drawings, are included merely for convenience of explanation and are not intended for limiting the scope of the present disclosure.

Referring to FIG. 1, a display device 1 may include a display panel 10. The display panel 10 may display an image.

The display device 1 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of explanation, it is illustrated and described that the first and second long sides LS1 and LS2 are longer than the first and second short sides SS1 and SS2, but it is also possible that lengths of the first and second long sides LS1 and LS2 may be approximately equal to lengths of the first and second short sides SS1 and SS2.

A direction parallel to the long sides LS1 and LS2 of the display device 1 may be referred to as a left-right direction. A direction parallel to the short sides SS1 and SS2 of the display device 1 may be referred to as an up-down direction. A direction perpendicular to the long sides LS1 and LS2 and the short sides SS1 and SS2 of the display device 1 may be referred to as a front-rear direction.

A side on which the display panel 10 displays an image may be referred to as a front side F, z, and a side opposite thereto may be referred to as a rear side R. The first long side LS1 may be referred to as an upper side U, y, and the second long side LS2 may be referred to as a lower side D. The first short side SS1 may be referred to as a left side Le, x, and the second short side SS2 may be referred to as a right side Ri.

The first long side LS1, the second long side LS2, the first short side SS1, and the second short side SS2 may be referred to as edges of the display device 1. Further, positions where the first long side LS1, the second long side LS2, the first short side SS1, and the second short side SS2 meet each other may be referred to as corners.

For example, a position where the first short side SS1 and the first long side LS1 meet may be referred to as a first corner C1. A position where the first long side LS1 and the second short side SS2 meet may be referred to as a second corner C2. A position where the second short side SS2 and the second long side LS2 meet may be referred to as a third corner C3. A position where the second long side LS2 and the first short side SS1 meet may be referred to as a fourth corner C4.

Figure 2:
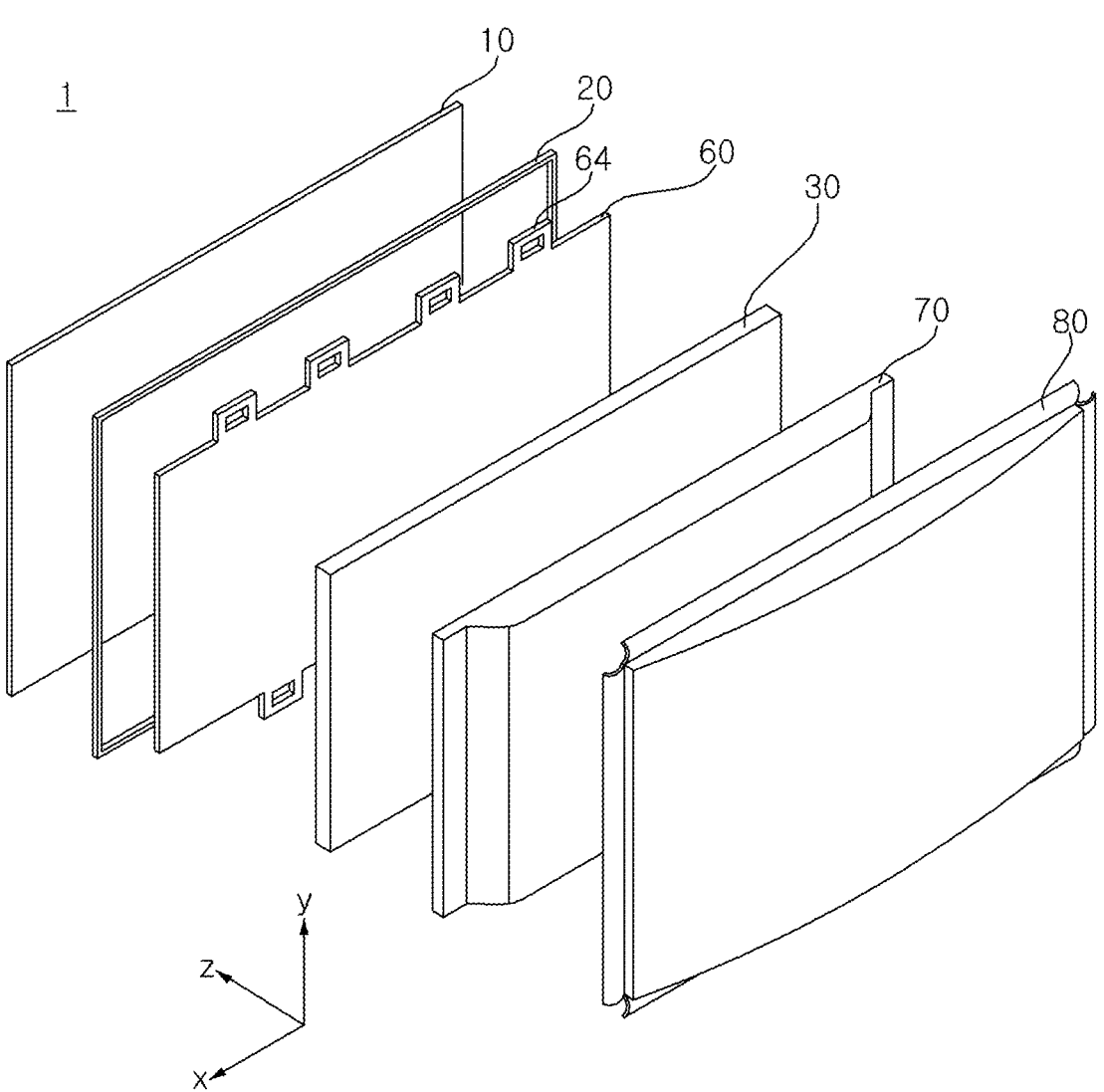

Referring to FIG. 2, the display device 1 may include the display panel 10, a guide panel 20, a backlight unit, a frame 70, and a back cover 80.

The display panel 10 may form a front surface of the display device 1 and may display an image. The display panel 10 may display an image in such a manner that a plurality of pixels output red, green or blue (RGB) for each pixel according to the timing. The display panel 10 may be divided into an active area, in which the image is displayed, and a de-active area in which the image is not displayed. The display panel 10 may include a front substrate and a rear substrate which are disposed opposite each other with a liquid crystal layer interposed therebetween. The display panel 10 may be referred to as an LCD panel.

The front substrate may include a plurality of pixels composed of red (R), green (G), and blue (B) subpixels. The front substrate may emit light corresponding to red, green, or blue color in response to a control signal.

The rear substrate may include switching elements. The rear substrate may switch on or off pixel electrodes. For example, the pixel electrode may change a molecular arrangement of a liquid crystal layer in response to a control signal received from the outside. The liquid crystal layer may include liquid crystal molecules. The arrangement of the liquid crystal molecules may change depending on a difference in voltage generated between the pixel electrode and a common electrode. The liquid crystal layer may allow or interrupt the transmission of the light from backlight units 30 and 40 to the front substrate.

The guide panel 20 may extend along a perimeter of the display panel 10. The guide panel 20 may cover a side surface of the display panel 10. The guide panel 20 may be coupled to the display panel 10. The guide panel 20 may support the display panel 10. The guide panel 20 may be referred to as a side frame or a middle cabinet.

The backlight unit may be disposed at the rear of the display panel 10. The backlight unit may be disposed at the front of the frame 70. The backlight unit may be coupled to the frame 70. The backlight unit may be driven by a full driving scheme or a partial driving scheme. For example, the backlight unit may be driven by a partial driving scheme, such as local dimming, impulsive driving, or the like.

The frame 70 may be disposed at the rear of the backlight unit. The frame 70 may support components of the display device 1. The display panel 10, the guide panel 20, and the backlight unit may be coupled to the frame 70. An edge of the frame 70 may be fixed to the guide panel 20. For example, the frame 70 may include a metal material. The frame 70 may be referred to as a module cover or a cover bottom.

The back cover 80 may be disposed at the rear of the frame 70. The back cover 80 may cover the rear of the frame 70. The back cover 80 may be coupled to the frame 70. For example, the back cover 80 may include a metal material. For example, the back cover 80 may be an injection-molded product made of a material, such as resin and the like.

Figure 3:
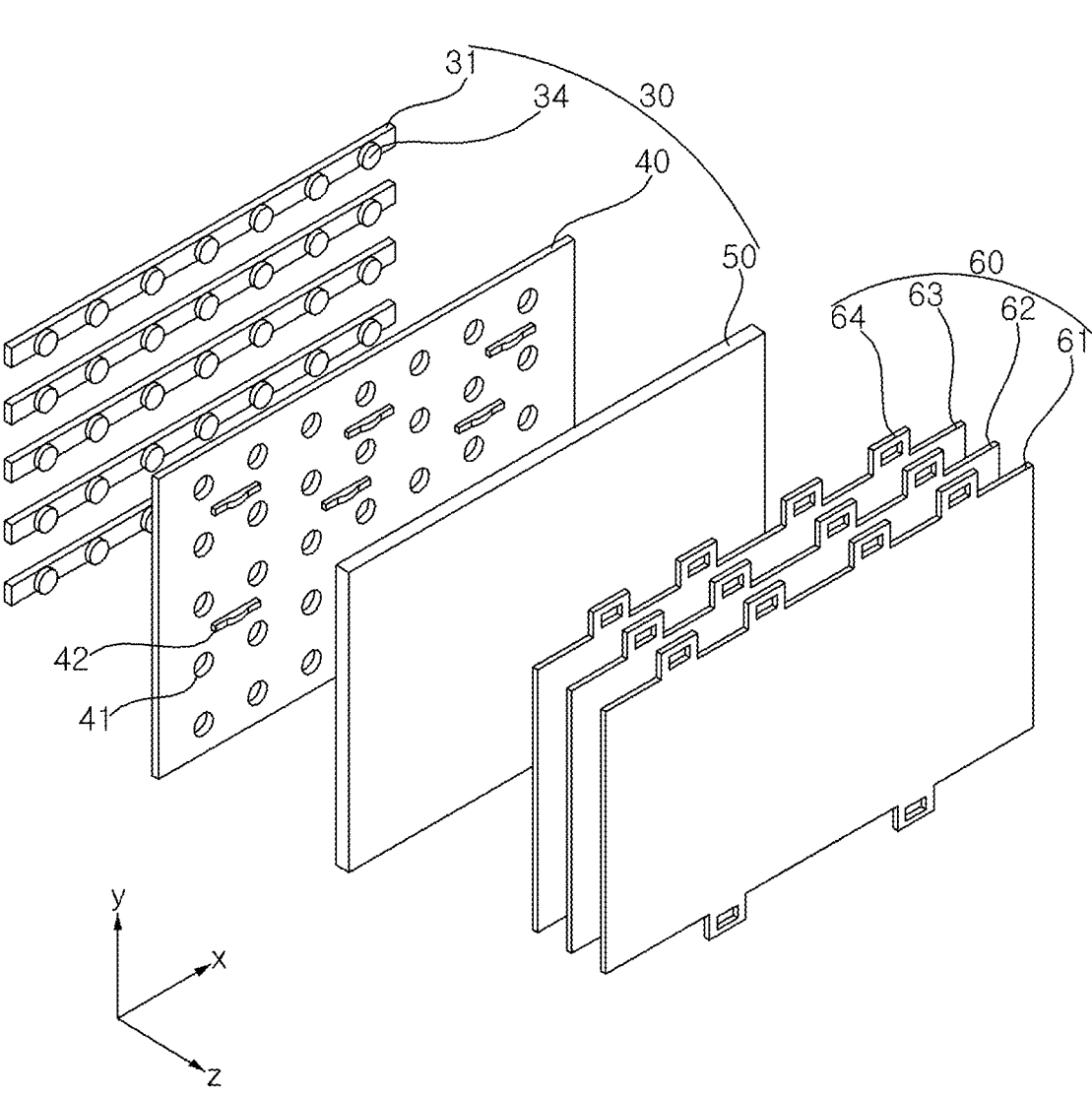

Referring to FIGS. 2 and 3, the backlight unit may include a substrate 31. For example, the substrate 31 may be provided in the form of a plurality of straps that extend in the left-right direction and are spaced apart from each other in the up-down direction. An optical assembly may be mounted on the substrate 31. A plurality of optical assemblies may be mounted on the substrate 31. An electrode pattern may be formed on the substrate 31 to connect an adapter and the optical assembly. For example, the electrode pattern may be a carbon nanotube electrode pattern. The substrate 31 may be made of at least one of polyethylene terephthalate (PET), glass, polycarbonate (PC), and silicon. For example, the substrate 31 may be a printed circuit board (PCB).

The optical assembly may provide light forward. The optical assembly may provide light to the display panel 10. A light source 34 of the optical assembly may be mounted on the substrate 31. A lens 35 of the optical assembly may cover the light source 34. The lens 35 may be fixed to the substrate 31. For example, the light source 34 may be a light emitting diode (LED) chip or an LED package including at least one LED chip. The light source 34 may be configured as a white LED or a colored LED emitting at least one color among colors such as red, green, and blue, and the like. The colored LED may include at least one of a red LED, a green LED, and a blue LED.

The backlight unit may include a reflective sheet 40. The reflective sheet 40 may be disposed at the front of the substrate 31. The reflective sheet 40 may be disposed between the substrate 31 and a diffusion plate 50. The reflective sheet 40 may be provided on a front surface of the substrate 31. The reflective sheet 40 may be coupled to the front surface of the substrate 31. The reflective sheet 40 may include a hole 41 through which the optical assembly is inserted. The reflective sheet 40 may be made of a reflective material. For example, the reflective sheet 40 may include at least one of a metal and a metal oxide. For example, the reflective sheet 40 may include a metal having a high reflectance, such as at least one of aluminum (Al), silver (Ag), gold (Au), or titanium dioxide (TiO2) and/or a metal oxide. For example, resin may be deposited or applied on the reflective sheet 40. The reflective sheet 40 may reflect light from the optical assembly. The reflective sheet 40 may diffuse light from the optical assembly.

The backlight unit may include the diffusion plate 50. The diffusion plate 50 may diffuse light from the light source 34. The diffusion plate 50 may be disposed between the reflective sheet 40 and an optical sheet 60. The diffusion plate 50 may be spaced forward from the reflective sheet 40. A supporter 42 may be disposed between the diffusion plate 50 and the reflective sheet 40. One surface of the supporter 42 may be fixed to the reflective sheet 40. Another surface of the supporter 42 may support the diffusion plate 50. The diffusion plate 50 may be spaced apart from the reflective sheet 40 by the supporter 42.

An air gap may be formed between the reflective sheet 40 and the diffusion plate 50. The air gap may serve as a buffer. Light provided from the light source 34 may be spread widely by the air gap. For example, a distance between the light source and the optical sheet 60 may be 10 mm or less.

The backlight unit may include the optical sheet 60. The optical sheet 60 may be disposed at the front of the diffusion plate 50. The optical sheet 60 may be opposite the display panel 20 with respect to the guide panel 20. The optical sheet 60 may be adjacent to or in contact with a front surface of the diffusion plate 50. The optical sheet 60 may include at least one optical sheet 60. For example, the optical sheet 60 may include a plurality of optical sheets 60 having different functions. For example, the optical sheet 60 may include one or more prism sheets and/or one or more diffusion sheets. The plurality of optical sheets 60 may be bonded or adhered to each other. For example, the optical sheet 60 may include a first optical sheet 61, a second optical sheet 62, and a third optical sheet 63. For example, the first optical sheet 61 may be a diffusion sheet, and the second optical sheet 62 and the third optical sheet 63 may be prism sheets. The diffusion sheet 61 may prevent light, emitted from the diffusion plate 50, from being partially concentrated, thereby making light distribution uniform. The prism sheets 62 and 63 may collect light emitted from the diffusion sheet 50 and provide the collected light to the display panel 10. Meanwhile, the number and/or position of the diffusion sheet and prism sheet may vary.

For example, the optical sheet 60 may change the wavelength or color of light provided from the light source 34. For example, the optical sheet 60 may include a red-based phosphor and/or a green-based phosphor. In this case, the optical sheet 60 may change blue-based light, provided from the light source 34, to white light. Meanwhile, the optical sheet 60 may be referred to as a quantum dot sheet.

A coupling part 64 of the optical sheet 60 may be coupled to the frame 70 and/or the back cover 80.

The substrate 31, the reflective sheet 40, and the diffusion plate 50 may be collectively referred to as an optical layer 30.

Figure 4:
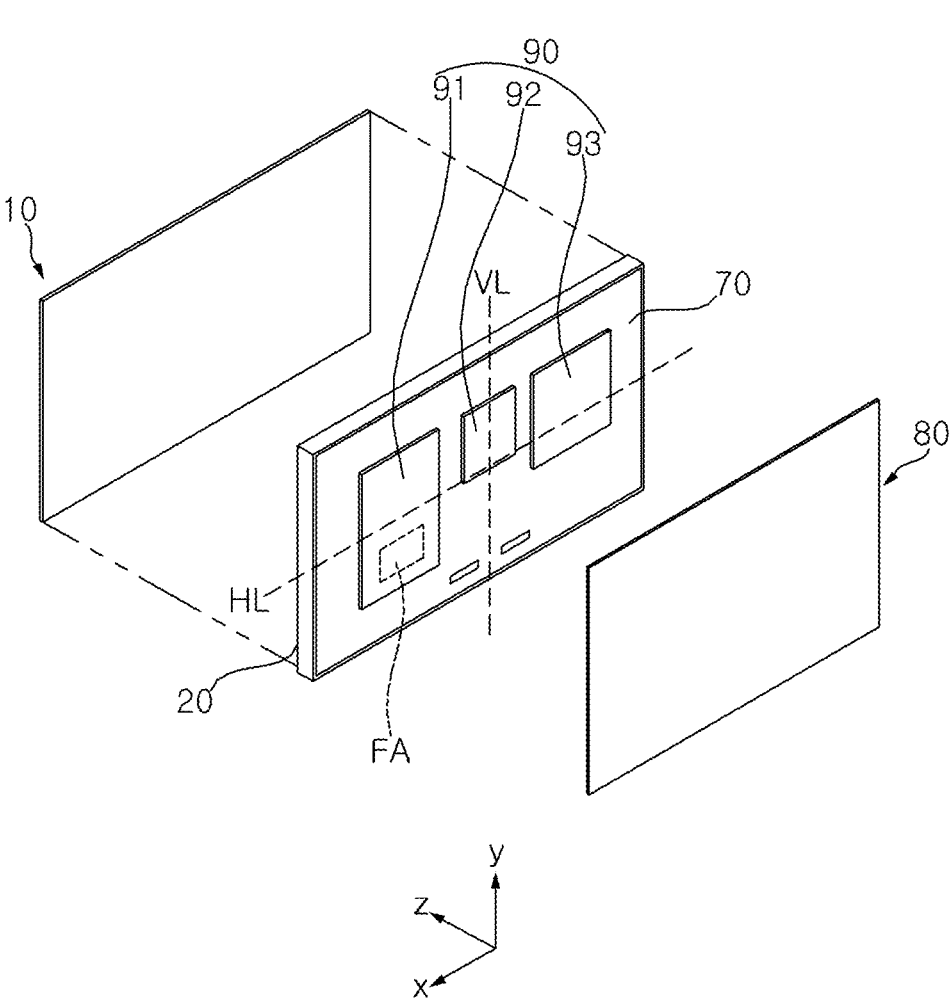

Referring to FIG. 4, boards 90 may be coupled to the frame 70 from the rear of the frame 70. The board 90 may include a plurality of electronic elements. The board 90 may be a Printed Circuit Board (PCB) and may be electrically connected to electronic components of the display device.

The boards 90 may include a power supply board 91 configured to supply power to each component of the display device 1, a timing controller board 92 configured to provide a video signal to the display panel 10, and a main board 93 configured to control the display device 1.

For example, the power supply board 91 may be adjacent to the left side of the frame 70. The main board 93 may be adjacent to the right side of the frame 70. The timing controller board 92 may be disposed between the power supply board 91 and the main board 93.

Figure 5:
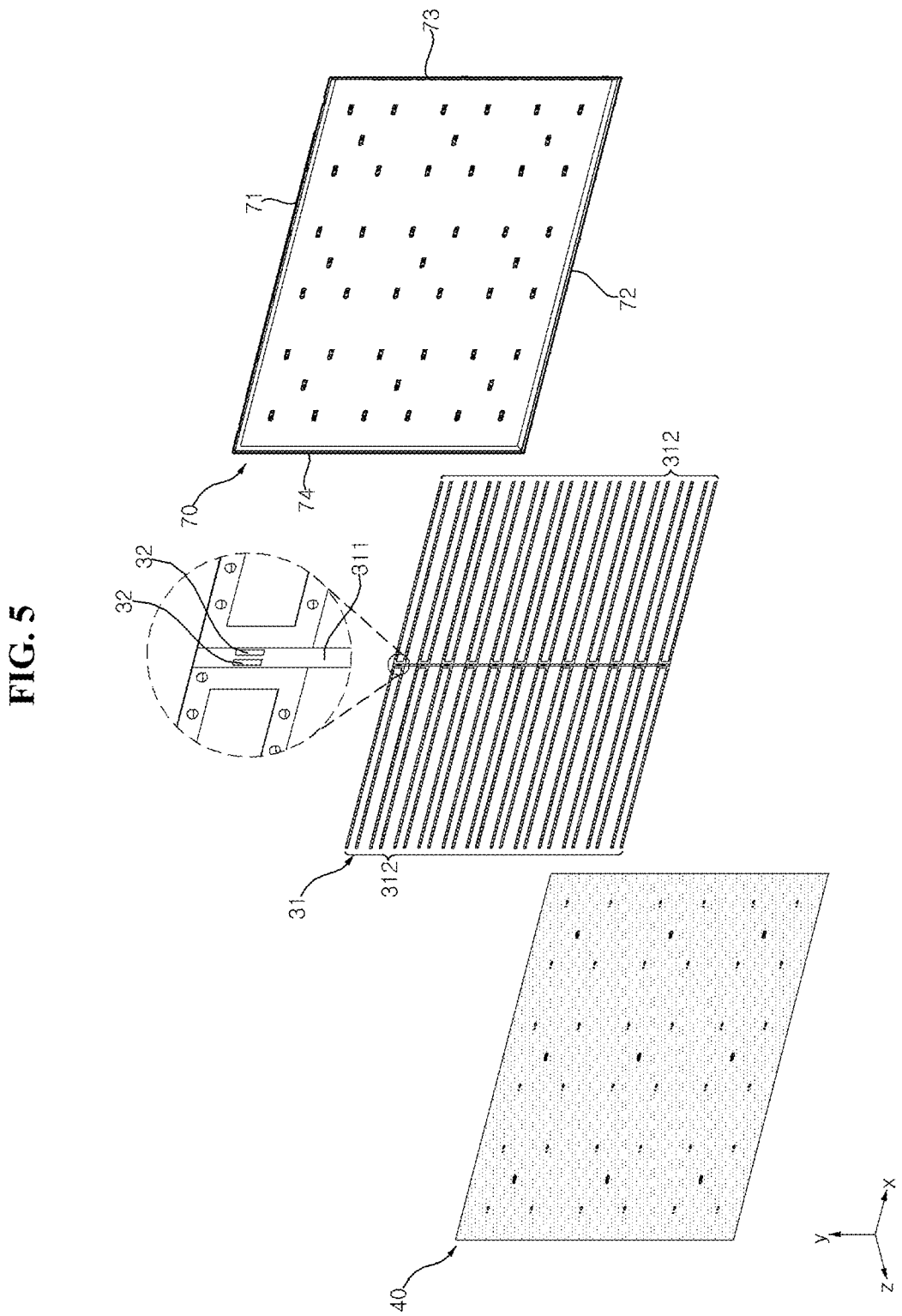
Figure 6:
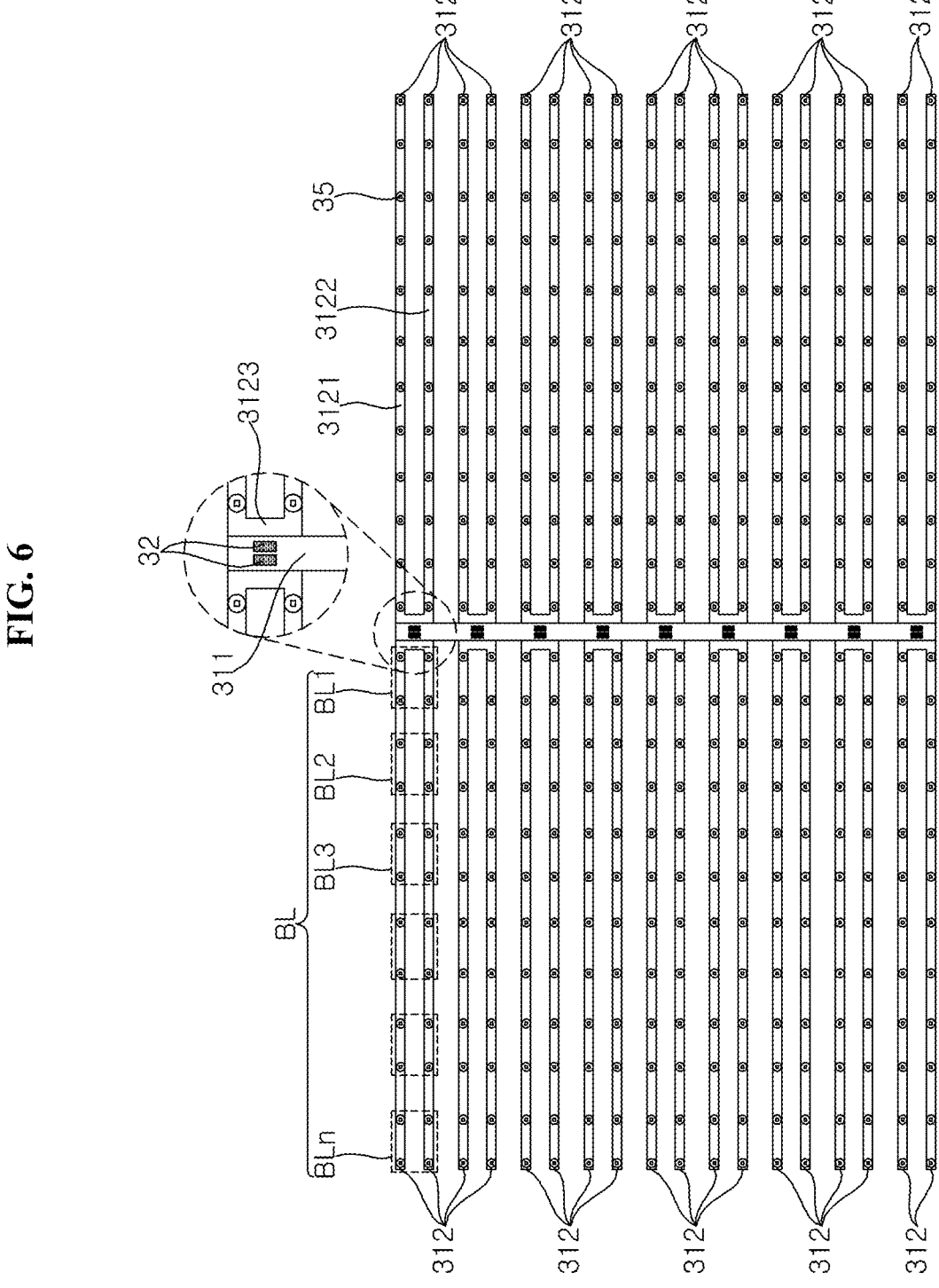

Referring to FIGS. 5 and 6, the frame 70 may include a first side 71, a second side 72 facing the first side 71, a third side 73 connecting the first side 71 and the second side 72, and a fourth side 74 connecting the first side 71 and the second side 72 and facing the third side 73. The first side 71 of the frame 70 may face the first long side LS1 of the display device 1. The second side 72 of the frame 70 may face the second long side LS2 of the display device 1. The third side 73 of the frame 70 may face the first short side SS1 of the display device 1. The fourth side 74 of the frame 70 may face the second short side SS2 of the display device 1.

The substrate 31 may be coupled to the frame 70. The substrate 31 may include a first substrate 311. The first substrate 311 may be elongated. For example, the first substrate 311 may be elongated in the up-down direction. The first substrate 311 may be elongated from a position adjacent to the first side 71 of the frame 70 to a position adjacent to the second side 72 thereof. The first substrate 311 may be disposed between the third side 73 and the fourth side 74 of the frame 70. The first substrate 311 may be parallel to the third side 73 and/or the fourth side 74 of the frame 70. A separation distance between the first substrate 311 and the third side 73 may be equal to a separation distance between the first substrate 311 and the fourth side 74. The first substrate 311 may be disposed at the center of the frame 70. In another example, the first substrate 311 may be elongated in the left-right direction. In this case, the first substrate 311 may be elongated from a position adjacent to the third side 73 of the frame 70 to a position adjacent to the fourth side 74 thereof. The first substrate 311 may be disposed between the first side 71 and the second side 72 of the frame 70. A separation distance between the first substrate 311 and the first side 71 may be equal to a separation distance between the first substrate 311 and the second side 72. The first substrate 311 may be parallel to the first side 71 and/or the second side 72 of the frame 70.

A connector 32 may be coupled to the first substrate 311. The connector 32 may be mounted on the first substrate 311. The connector 32 may be mounted on a front surface of the first substrate 311. The connector 32 may be electrically connected to a power device (not shown). The connector 32 may include a plurality of connectors 32. The plurality of connectors 32 may be spaced apart from each other in a longitudinal direction of the first substrate 311. Some of the plurality of connectors 32 may be disposed adjacent to a first long side of the first substrate 311 and may be spaced apart along the first long side of the first substrate 311. The rest of the plurality of connectors 32 may be disposed adjacent to a second long side of the first substrate 311 and may be spaced apart along the second long side of the first substrate 311. For example, the plurality of connectors 32 may be mounted in two lines on the first substrate 311. A connector coupling part 33, which will be described later, may be coupled to the connector 32. In this manner, the first substrate 311 may be electrically connected to the second substrate 312.

The substrate 31 may include a second substrate 312. The second substrate 312 may be electrically connected to the first substrate 311. The second substrate 312 may be elongated in a direction perpendicular to a longitudinal direction of the first substrate 311. For example, in the case where the first substrate 311 extends in the up-down direction, the second substrate 312 may be elongated in the left-right direction. For example, in the case where the first substrate 311 extends in the left-right direction, the second substrate 312 may be elongated in the up-down direction.

The first substrate 311 may include a plurality of second substrates 312. The plurality of second substrates 312 may be electrically connected to the first substrate 311. The plurality of second substrates 312 may be spaced apart from each other in the longitudinal direction of the first substrate 311. The frame 70 may be exposed to a separation space between the plurality of second substrates 312. Some of the plurality of second substrates 312 may be disposed between the first substrate 311 and the third side 73 of the frame 70 and may be coupled to the first long side of the first substrate 311. The rest of the plurality of second substrates 312 may be disposed between the first substrate 311 and the fourth side 74 of the frame 70 and may be coupled to the second long side of the first substrate 311.

The second substrate 312 may include a first plate 3121. The first plate 3121 may be elongated in a direction perpendicular to the longitudinal direction of the first substrate 311. The first plate 3121 may extend from the first long side of the first substrate 311 to a position adjacent to the third side 73 of the frame 70. The first plate 3121 may extend from the second long side of the first substrate 311 to a position adjacent to the fourth side 74 of the frame 70.

The second substrate 312 may include a second plate 3122. The second plate 3122 may be elongated in a direction perpendicular to the longitudinal direction of the first substrate 311. The second plate 3122 may extend from the first long side of the first substrate 311 to a position adjacent to the third side 73 of the frame 70. The second plate 3122 may extend from the second long side of the first substrate 311 to a position adjacent to the fourth side 74 of the frame 70. The second plate 3122 may be spaced apart from the first plate 3121 in the longitudinal direction of the first substrate 311. The frame 70 may be exposed to a separation space between the first plate 3121 and the second plate 3122. The second plate 3122 may be parallel to the first plate 3121. A length of the second plate 3122 may be equal to a length of the first plate 3121.

The second substrate 312 may include a third plate 3123. The third plate 3123 may connect the first plate 3121 and the second plate 3122. The third plate 3123 may be coupled to one side surface of the first plate 3121 and one side surface of the second plate 3122. The third plate 3123 may extend in the longitudinal direction of the first substrate 311. The third plate 3123 may be coupled to the first substrate 311.

The first plate 3121, the second plate 3122, and the third plate 3123 may be formed as one body.

The optical assembly may be mounted on the second substrate 312. The optical assembly may be mounted on the first plate 3121 and the second plate 3122. The optical assembly may include a plurality of optical assemblies. The plurality of optical assemblies may be spaced apart from each other in the longitudinal direction of the first plate 3121. The plurality of optical assemblies may be spaced apart from each other in the longitudinal direction of the second plate 3122. The optical assembly may not be mounted on the third plate 3123. The optical assembly may not be mounted on the first plate 311. However, the optical assembly is not limited thereto and may also be mounted on the first substrate 311 and the third plate 3123.

The connector coupling part 33 may be mounted on the third plate 3123. The connector coupling part 33 may be inserted into the connector 32. The connector coupling part 33 may be inserted into the connector 32 to come into contact with a terminal end (not shown). Accordingly, the first substrate 311 may be electrically connected to the second substrate 312.

The reflective sheet 40 may be coupled to the substrate 31. The reflective sheet 40 may have a shape and size corresponding to the size of the frame 70. For example, the reflective sheet 40 may have a rectangular shape with long sides in the left-right direction. The reflective sheet 40 may cover the first substrate 311 and the second substrate 312. The reflective sheet 40 may cover the separation space between the plurality of second substrates 312. The reflective sheet 40 may cover the separation space between the first plate 3121 and the second plate 3122.

Figure 7:
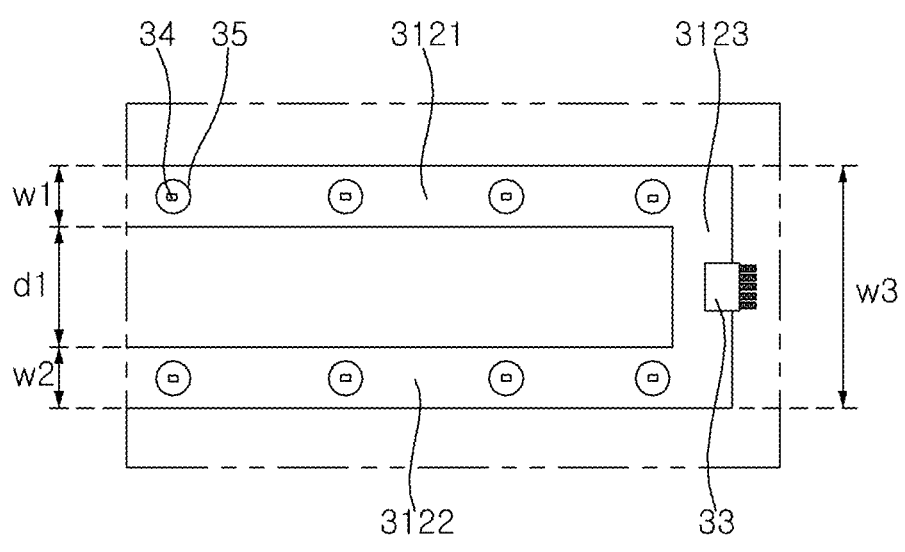

Referring to FIG. 7, the optical assembly may include a light source 34. The light source 34 may include a plurality of light sources 34. The plurality of light sources 34 may be mounted on the first plate 3121 and may be spaced apart from each other in the longitudinal direction of the first plate 3121. The plurality of light sources 34 may be mounted on the second plate 3122 and may be spaced apart from each other in the longitudinal direction of the second plate 3122. The light sources 34 mounted on the first plate 3121 and the light sources 34 mounted on the second plate 3122 may overlap in a longitudinal direction of the third plate 3123. The light source 34 may include an LED having a size of 500 um or more.

The lens 35 may cover the light source 34. The lens 35 may be provided in number corresponding to the number of the plurality of light sources 34. The lens 35 may be formed by dispensing a mixture onto the light sources 34 mounted on the first and second plates 3121 and 3122. The lens 35 may be formed by curing the mixture dispensed onto the light sources 34. For example, the lens 35 may be a silicone lens. The lens 35 may enhance the light extraction efficiency and may function as an optical system. For example, the lens 35 may have a dome shape. For example, the lens 35 may be in the shape of two convex domes overlapping each other. For example, the lens 35 may be a lens with asymmetric light distribution.

The first plate 3121 may have a first width w1 in the longitudinal direction of the first substrate 311. The second plate 3122 may have a second width w2 in the longitudinal direction of the first substrate 311. The third plate 3123 may have a third width w3 in the longitudinal direction of the first substrate 311. The first width w1 may be equal to the second width w2. The third width w3 may be greater than the first width w1 and the second width w2. The third width w3 may be equal to four times the first width w1. The third width w3 may be equal to four times the second width w2. The first plate 3121 and the second plate 3122 may be spaced apart from each other by a first distance d1 in the longitudinal direction of the first substrate 311. The first distance d1 may be greater than the first width w1 and the second width w2. The first distance d1 may be smaller than the third width w3. The first distance d1 may be equal to twice the first width w1. The first distance d1 may be equal to twice the second width w2.

Figure 8:
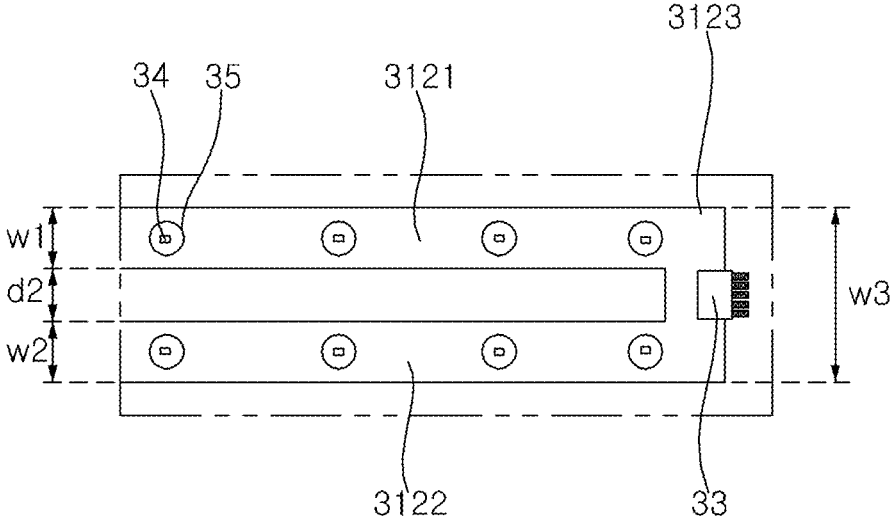

Referring to FIG. 8, the first plate 3121 may have the first width w1 in the longitudinal direction of the first substrate 311. The second plate 3122 may have the second width w2 in the longitudinal direction of the first substrate 311. The third plate 3123 may have the third width w3 in the longitudinal direction of the first substrate 311. The first width w1 may be equal to the second width w2. The third width w3 may be greater than the first width w1 and the second width w2. The third width w3 may be equal to three times the first width w1. The third width w3 may be equal to three times the second width w2. The first plate 3121 and the second plate 3122 may be spaced apart from each other by a second distance d2 in the longitudinal direction of the first substrate 311. The second distance d2 may be smaller than the third width w3. The second distance d2 may be equal to the first width w1 and the second width w2.

Figure 9:
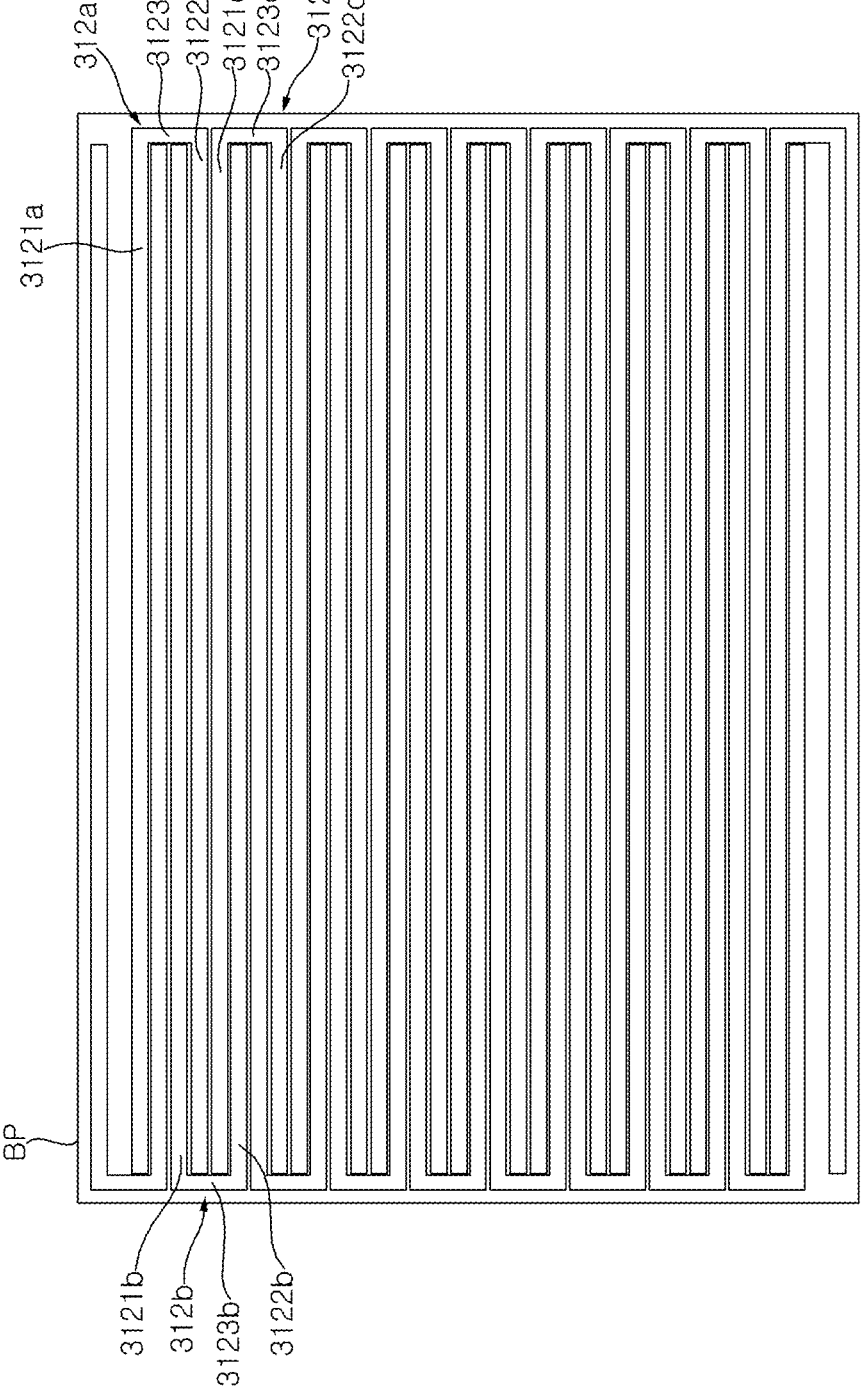

Referring to FIGS. 7 and 9, the plurality of second substrates 312 may be manufactured from a single board basic plate BP. For example, the board basic plate BP may be a Printed Circuit Board (PCB). For example, the board basic plate BP may have a square plate shape. The plurality of second substrates 312 may be alternately arranged on the single board basic plate BP. The plurality of second substrates 312 may be disposed in a zigzag manner on the single board basic plate BP. For example, the plurality of second substrates 312 may include a 2-1 substrate 312a, a 2-2 substrate 312b, and a 2-3 substrate 312c that are adjacent to each other on the board basic plate BP. The 2-1 substrate 312a and the 2-3 substrate 312c may extend in the same direction, and the 2-2 substrate 312b may extend in a direction opposite an extension direction of the 2-1 substrate 312a. The 2-1 substrate 312a and the 2-3 substrate 312c may extend in a direction from a first side of the board basic plate BP toward a second side thereof, and the 2-2 substrate 312b may extend in a direction from the second side of the board basic plate BP toward the first side thereof. A third plate 3123a of the 2-1 substrate 312a and a third plate 3123c of the 2-3 substrate 312c may be positioned adjacent to the first side of the board basic plate BP, and a third plate 3123b of the 2-2 substrate 312b may be positioned adjacent to the second side of the board basic plate BP. A second plate 3122a of the 2-1 substrate 312a and a first plate 3121c of the 2-3 substrate 312c may be disposed in a separation space between a first plate 3121b and a second plate 3122b of the 2-2 substrate 312b. The second plate 3122a of the 2-1 substrate 312a may be disposed between the first plate 3121b of the 2-2 substrate 312b and the first plate 3121c of the 2-3 substrate 312c on the board basic plate BP. The first plate 3121c of the 2-3 substrate 312c may be disposed between a second plate 3122c of the 2-1 substrate 312c and the second plate 3122b of the 2-2 substrate 312b on the board basic plate BP. In this case, the widths w1 and w2 (see FIG. 7) of the first plates 3121a, 3121b, and 3121c and the second plates 3122a, 3122b, and 3122c are the same, and the separation distance d1 (see FIG. 7) between each of the first plates 3121a, 3121b, and 3121c and each of the second plates 3122a, 3122b, and 3122c may have a value twice the width w1 (see FIG. 7) of the respective first plates 3121a, 3121b, and 3121c. In this case, one side of the second plate 3122a of the 2-1 substrate 312a may contact or face the first plate 3121b of the 2-2 substrate 312b, and another side thereof may contact or face the first plate 3121c of the 2-3 substrate 312c. One side of the first plate 3121c of the 2-3 plate 312c may contact or face the second plate 3122b of the 2-2 substrate 312b, and another side thereof may contact or face the second plate 3122a of the 2-1 substrate 312a. Accordingly, it is possible to have a high chamfering efficiency on the board basic plate (or the mother board) BP, and to increase cost competitiveness of the substrate. Accordingly, material costs may be reduced while ensuring image quality characteristics.

Figure 10:
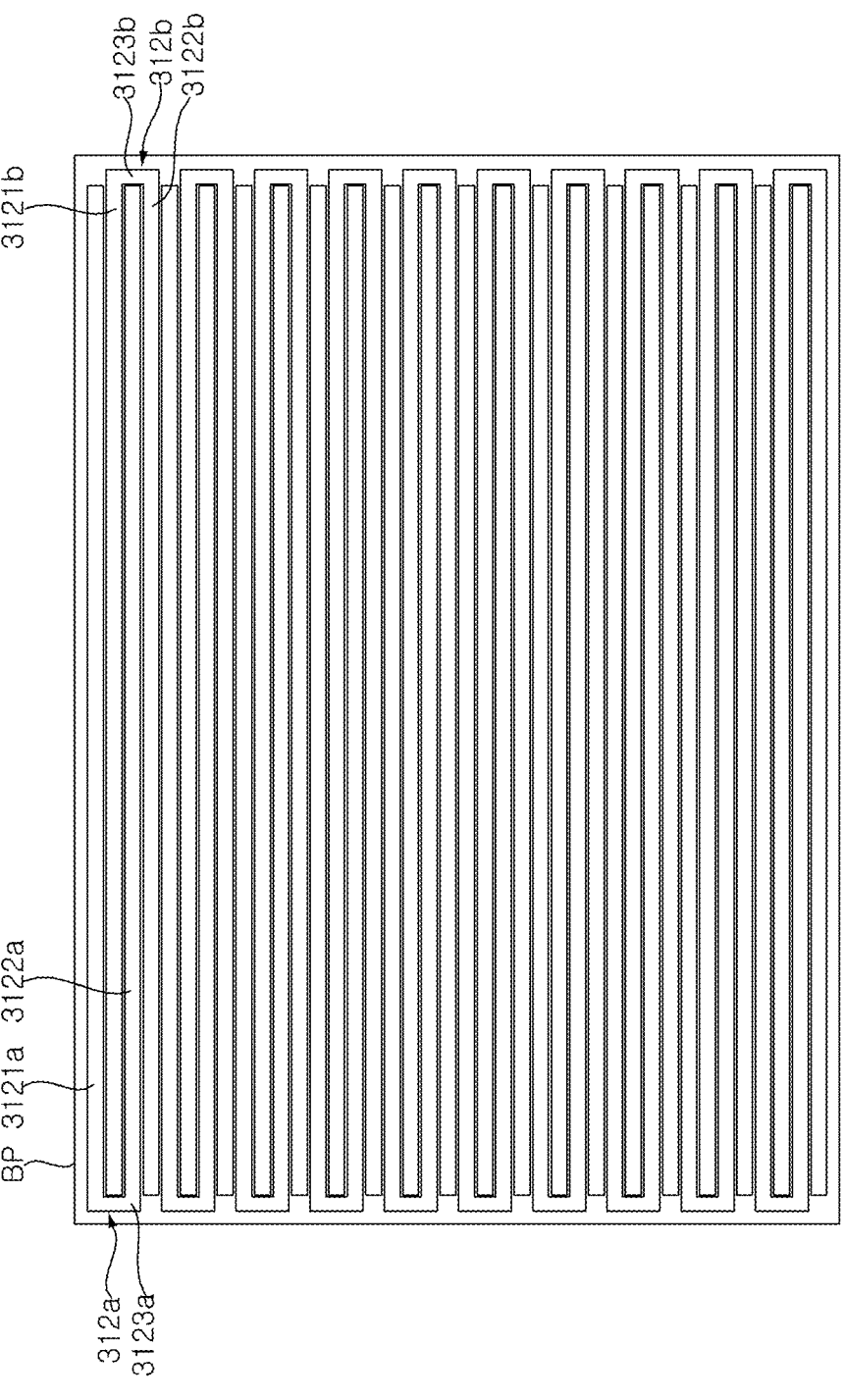

Referring to FIGS. 8 and 10, the plurality of second substrates 312 may be manufactured from a single board basic plate BP. For example, the board basic plate BP may have a square plate shape. The plurality of second substrates 312 may be alternately arranged on the single board basic plate BP. The plurality of second substrates 312 may be disposed in a zigzag manner on the single board basic plate BP. For example, the plurality of second substrates 312 may include a 2-1 substrate 312a and a 2-2 substrate 312b that are adjacent to each other on the board basic plate BP. A third plate 3213a of the 2-1 substrate 312a may be positioned adjacent to the first side of the board basic plate BP. A third plate 3123b of the 2-2 substrate 312b may be positioned adjacent to the second side of the board basic plate BP. The 2-1 substrate 312a may extend in a direction from the first side of the board basic plate BP toward the second side thereof. The 2-2 substrate 312b may extend in a direction from the second side of the board basic plate BP toward the first side thereof. That is, the extension direction of the 2-1 substrate 312a and the extension direction of the 2-2 substrate 312b may be opposite each other. The first plate 3121b of the 2-2 substrate 312b may be disposed between the first plate 3121a and the second plate 3122a of the 2-1 substrate 312a. In this case, the width w1 (see FIG. 8) of the first plate 3121b of the 2-2 substrate 312b may be equal to the separation distance d2 (see FIG. 8) between the first plate 3121a and the second plate 3122a of the 2-1 substrate 312a. The second plate 3122a of the 2-1 substrate 312a may be disposed between the first plate 3121b and the second plate 3122b of the 2-2 substrate 312b. In this case, the width w2 (see FIG. 8) of the second plate 3122b of the 2-1 substrate 312a may be equal to the separation distance d2 (see FIG. 8) between the first plate 3121b and the second plate 3122b of the 2-2 substrate 312b. Accordingly, it is possible to have a high chamfering efficiency on the board basic plate BP, and to increase cost competitiveness of the substrate. Accordingly, material costs may be reduced while ensuring image quality characteristics.

Referring back to FIG. 6, the backlight unit may include a plurality of blocks BL: BL1, BL2, BL3, 쩔, BLn. The backlight unit may be divided into a plurality of blocks BL and driven. The display panel 10 may implement local dimming for each of the plurality of blocks BL. The block BL may be referred to as a local dimming block, a dimming block, or a dimming zone.

The plurality of blocks BL may be formed on the second substrate 312. The plurality of blocks BL may be formed on each of the plurality of second substrates 312. For example, the second substrate 312 may include a 2-1 substrate, a 2-2 substrate, a 2-3 substrate, 쩔, and a 2-n substrate which are spaced apart from each other. Each of the 2-1 substrate, the 2-2 substrate, the 2-3 substrate, 쩔, and the 2-n substrate may include the plurality of blocks BL.

The block BL may include a plurality of light sources 34. The block BL may include some of the plurality of light sources 34 mounted on the first plate 3121 and some of the plurality of light sources 34 mounted on the second plate 3122. Accordingly, the block BL may have a block shape which is a square or nearly square shape. The block BL may be a block of a quadrilateral shape with the length of long sides being similar to the length of short sides. Accordingly, brightness may be adjusted in units of blocks BL having a nearly square shape, thereby achieving a fine contrast ratio and enabling excellent image quality.

Figure 11:
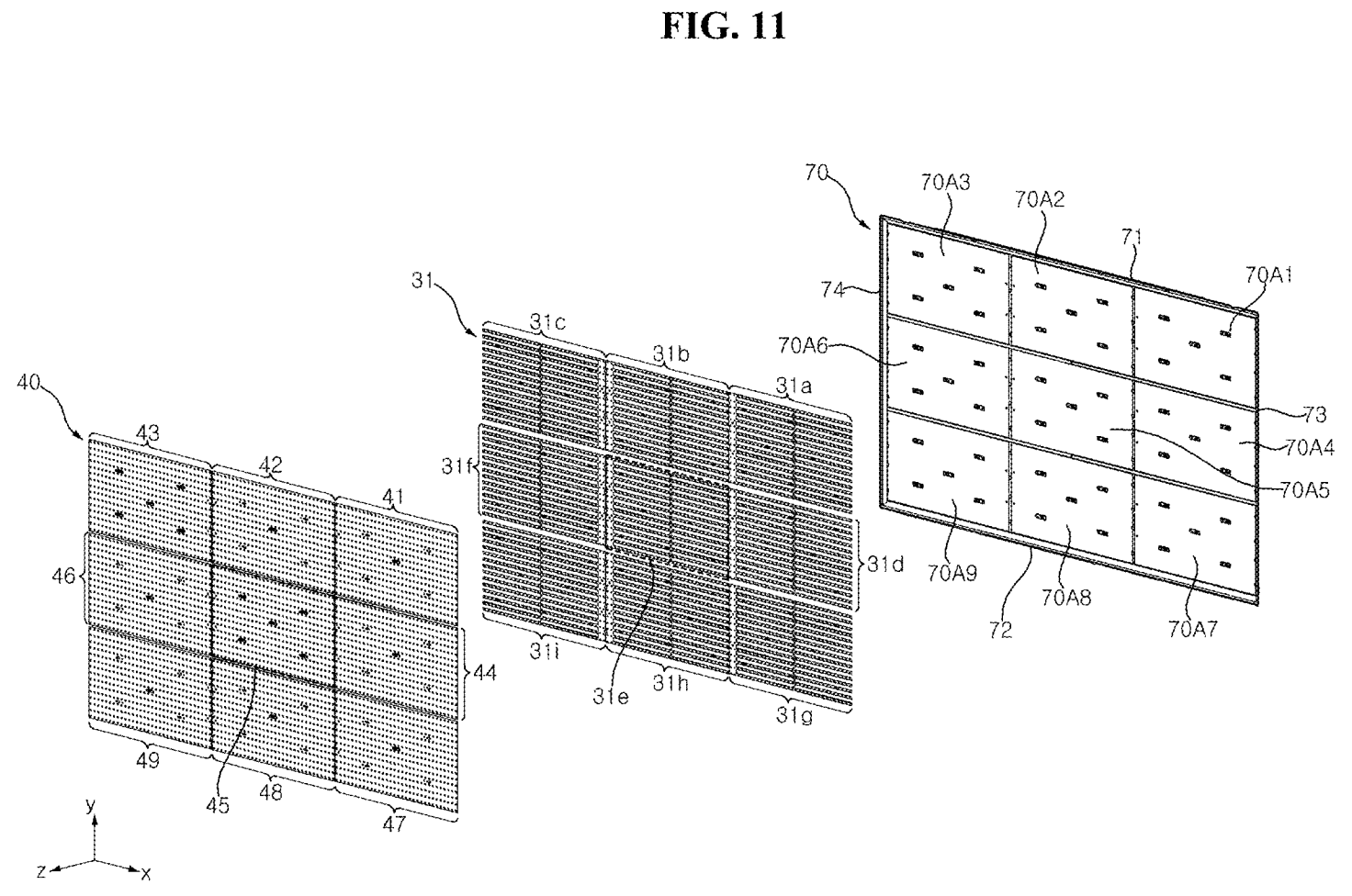

Referring to FIG. 11, the substrate 31 may be coupled to the frame 70, and the reflective sheet 40 may be coupled to the substrate 31. The reflective sheet 40, the substrate 31, and the frame 70 may be disposed in the order from front to back.

The frame 70 may include a plurality of regions. For example, the frame 70 may include a first region 70A1, a second region 70A2, a third region 70A3, a fourth region 70A4, a fifth region 70A5, a sixth region 70A6, a seventh region 70A7, an eighth region 70A8, and a ninth region 70A9. The first region 70A1 may form a corner at which the first side 71 and the third side 73 of the frame 70 meet. The third region 70A3 may form a corner at which the first side 71 and the fourth side 74 of the frame 70 meet. The second region 70A2 may be adjacent to the first side 71 of the frame 70 and may be disposed between the first region 70A1 and the second region 70A2. The seventh region 70A7 may form a corner at which the second side 72 and the third side 73 of the frame 70 meet. The ninth region 70A9 may form a corner at which the second side 72 and the fourth side 74 meet. The eight region 70A8 may be adjacent to the second side 72 and may be disposed between the seventh region 70A7 and the ninth region 70A9. The fourth region 70A4 may be adjacent to the third side 73 and may be disposed between the first region 70A1 and the seventh region 70A7. The sixth region 70A6 may be adjacent to the fourth side 74 and may be disposed between the third region 70A3 and the ninth region 70A9. The fifth region 70A5 may be disposed between the fourth region 70A4 and the sixth region 70A6 in the left-right direction. The fifth region 70A5 may be disposed between the second region 70A2 and the eighth region 70A8 in the up-down direction.

The substrate 31 may include a plurality of substrates 31. Each of the plurality of substrates 31 may be aligned from front to rear with the plurality of regions of the frame 70. The respective substrates 31 may be coupled to the plurality of regions of the frame 70. For example, the substrate 31 may include a plurality of substrates 31a, 31b, 31c, 31d, 33e, 33f, 33g, 33h, and 33i coupled to the first to ninth regions 70A1, 70A2, 70A3, 70A4, 70A5, 70A6, 70A7, 70A8, and 70A9, respectively, of the frame 70. The plurality of substrates 31a, 31b, 31c, 31d, 33e, 33f, 33g, 33h, and 33i may be formed to be the same. Each of the plurality of substrates 31a, 31b, 31c, 31d, 33e, 33f, 33g, 33h, and 33i may have the size corresponding to the first to ninth regions 70A1, 70A2, 70A3, 70A4, 70A5, 70A6, 70A7, 70A8, and 70A9 of the frame 70.

The reflective sheet 40 may include a plurality of reflective sheets 40 aligned from front to rear with each of the plurality of substrates 31. The plurality of reflective sheets 40 may have a size corresponding to each of the plurality of substrates 31a, 31b, 31c, 31d, 33e, 33f, 33g, 33h, and 33i. For example, the plurality of reflective sheets 40 may include first to ninth reflective sheets 41, 42, 43, 44, 45, 46, 47, 48, and 49. A first reflective sheet 41 may be aligned from front to rear with the first region 70A1 of the frame 70 and the substrate 31a coupled to the first region 70A1. A second reflective sheet 42 may be aligned from front to rear with the second region 70A2 of the frame 70 and the substrate 31b coupled to the second region 70A2. A third reflective sheet 43 may be aligned from front to rear with the third region 70A3 of the frame 70 and the substrate 31c coupled to the third region 70A3. A fourth reflective sheet 44 may be aligned from front to rear with the fourth region 70A4 of the frame 70 and the substrate 31d coupled to the fourth region 70A4. A fifth reflective sheet 45 may be aligned from front to rear with the fifth region 70A5 of the frame 70 and the substrate 31e coupled to the fifth region 70A5. A sixth reflective sheet 46 may be aligned from front to rear with the sixth region 70A6 of the frame 70 and the substrate 31f coupled to the sixth region 70A6. A seventh reflective sheet 47 may be aligned from front to rear with the seventh region 70A7 of the frame 70 and the substrate 31g coupled to the seventh region 70A7. An eighth reflective sheet 48 may be aligned from front to rear with the eighth region 70A8 of the frame 70 and the substrate 31h coupled to the eighth region 70A8. A ninth reflective sheet 49 may be aligned from front to rear with the ninth region 70A9 of the frame 70 and the substrate 31i coupled to the ninth region 70A9.

Referring to FIGS. 11 and 6, the plurality of substrates 31a, 31b, 31c, 31d, 33e, 33f, 33g, 33h, and 33i may be formed to be the same. The substrates 31a, 31b, 31c, 31d, 33e, 33f, 33g, 33h, and 33i, respectively coupled to the plurality of regions 70A1, 70A2, 70A3, 70A4, 70A5, 70A6, 70A7, 70A8, and 70A9 of the frame 70 of FIG. 11 may have the same structure. The substrate 31a coupled to the first region 70A1 of the frame 70 may be the same as the substrate illustrated in FIG. 6.

The substrate 31a may include the first substrate 311. The first substrate 311 may be elongated. The first substrate 311 may be elongated in the up-down direction. In this case, the first substrate 311 may be elongated from the upper side toward the lower side of the first region 70A1. The first substrate 311 may extend parallel to the third side 73 of the frame 70, and the first substrate 311 may be disposed at the center of the first region 70A1 of the frame 70. In another example, the first substrate 311 may be elongated in the left-right direction. In this case, the first substrate 311 may be elongated from the left side toward the right side of the first region 70A1 of the frame 70. The first substrate 311 may extend parallel to the first side 71 of the frame 70, and the first substrate 311 may be disposed at the center of the first region 70A1 of the frame 70.

A connector 32 may be coupled to the first substrate 311. The connector 32 may be mounted on the first substrate 311. The connector 32 may be mounted on the front surface of the first substrate 311. The connector 32 may be electrically connected to a power device (not shown). The connector 32 may include a plurality of connectors 32. The plurality of connectors 32 may be spaced apart from each other in the longitudinal direction of the first substrate 311. Some of the plurality of connectors 32 may be disposed adjacent to the first long side of the first substrate 311 and may be spaced apart along the first long side of the first substrate 311. The rest of the plurality of connectors 32 may be disposed adjacent to the second long side of the first substrate 311 and may be spaced apart along the second long side of the first substrate 311. For example, the plurality of connectors 32 may be mounted in two lines on the first substrate 311. A connector coupling part 33, which will be described later, may be coupled to the connector 32. In this manner, the first substrate 311 may be electrically connected to the second substrate 312.

The substrate 31*a* may include the second substrate 312. The second substrate 312 may be electrically connected to the first substrate 311. The second substrate 312 may be elongated in a direction perpendicular to the longitudinal direction of the first substrate 311. The second substrate 312 may include a plurality of second substrates 312. The plurality of second substrates 312 may be spaced apart from each other in the longitudinal direction of the first substrate 311. The frame 70 may be exposed to a separation space between the plurality of second substrates 312. Some of the plurality of second substrates 312 may be disposed between the first substrate 311 and the left side of a first region 79A1 of the frame 70 and may be coupled to the first long side of the first substrate 311. The rest of the plurality of second substrates 312 may be disposed between the first substrate 311 and the right side of the first region 70A1 of the frame 70 and may be coupled to the second long side of the first substrate 311.

The second substrate 312 may include the first plate 3121. The first plate 3121 may be elongated in a direction perpendicular to the longitudinal direction of the first substrate 311.

The second substrate 312 may include the second plate 3122. The second plate 3122 may be elongated in a direction perpendicular to the longitudinal direction of the first substrate 311. The second plate 3122 may extend in a direction parallel to the first plate 3121. The second plate 3122 may have the same shape as the first plate 3121. The second plate 3122 may be spaced apart from the first plate 3121 in the longitudinal direction of the first substrate 311.

The second substrate 312 may include the third plate 3123. The third plate 3123 may connect the first plate 3121 and the second plate 3122. The third plate 3123 may extend in the longitudinal direction of the first substrate 311. The third plate 3123 may be coupled to the first substrate 311.

The first plate 3121, the second plate 3122, and the third plate 3123 may be formed as one body.

The second substrate 312 may have a structure similar to that of the second substrate 312 illustrated in FIG. 7. That is, the first plate 3121 of the second substrate 312 may have the first width w1, and the second plate 3122 of the second substrate 312 may have the second width w2 which is equal to the first width w1. In this case, a separation distance between the first plate 3121 and the second plate 3122 may be a first distance d1 which is twice the first width w1 and/or the second width w2. Accordingly, it is possible to have a high chamfering efficiency on the board basic plate BP, and to increase cost competitiveness of the substrate. Accordingly, material costs may be reduced while ensuring image quality characteristics.

The second substrate 312 may have a structure similar to that of the second substrate 312 illustrated in FIG. 8. That is, the first plate 3121 of the second substrate 312 may have the first width w1, and the second plate 3122 of the second substrate 312 may have the second width w2 which is equal to the first width w1. In this case, a separation distance between the first plate 3121 and the second plate 3122 may be a second distance d2 which is equal to the first width w1 and/or the second width w2. Accordingly, it is possible to secure a high chamfering efficiency on the board basic plate BP, and to increase cost competitiveness of the substrate. Accordingly, material costs may be reduced while ensuring image quality characteristics.

The optical assembly may be mounted on the second substrate 312. The optical assembly may be mounted on the first plate 3121 and the second plate 3122. The optical assembly may include a plurality of optical assemblies. The plurality of optical assemblies may be spaced apart from each other in the longitudinal direction of the first plate 3121. The plurality of optical assemblies may be spaced apart from each other in the longitudinal direction of the second plate 3122. The optical assembly may not be mounted on the third plate 3123. The optical assembly may not be mounted on the first plate 311. However, the optical assembly is not limited thereto and may also be mounted on the first substrate 311 and the third plate 3123.

The optical assembly may include the light source 34 and the lens 35 covering the light source 34. The light source 34 may include an LED having a size of 500 um or less. The lens may have a diameter which is equal to or smaller than the first width w1 of the first plate 3121 and/or the second width w2 of the second plate 3122.

The connector coupling part 33 may be mounted on the third plate 3123. The connector coupling part 33 may be inserted into the connector 32. The connector coupling part 33 may be inserted into the connector 32 to come into contact with a terminal end (not shown). Accordingly, the first substrate 311 may be electrically connected to the second substrate 312.

Referring to FIGS. 1 to 11, a display device 1 according to an embodiment of the present disclosure includes: a display panel 10; a frame 70 coupled to the display panel 10; a substrate 31 disposed between the display panel 10 and the frame 70, and coupled to the frame 70; a light source 34 mounted on the substrate 31; and a reflective sheet 40 disposed on the substrate 31, and having a hole through which the light source 34 passes, wherein the substrate 31 includes: a first substrate 311 which is elongated; and a second substrate 312 which is electrically connected to the first substrate 311, wherein the second substrate 312 includes: a first plate 1321 extending in a direction intersecting a longitudinal direction of the first substrate 311; a second plate 3122 extending in the longitudinal direction of the first plate 3121, and spaced apart from the first plate 3121 in the longitudinal direction of the first plate 3121; and a third plate 3123 connecting the first plate 3121 and the second plate 3122, and electrically connected to the first substrate.

According to another embodiment of the present disclosure, the light source 23 may include a plurality of light sources 34 which are mounted on the first plate 3121 and the second plate 3122, and are spaced apart from each other in a longitudinal direction of each of the first plate 3121 and the second plate 3122.

According to yet another embodiment of the present disclosure, the display device may include a lens 35 fixed to the substrate 31 and covering the light source 34, wherein the lens 35 may have a diameter equal to or smaller than widths of the first plate 3121 and the second plate 3122 in a longitudinal direction of the first substrate 31.

According to yet another embodiment of the present disclosure, the display device may include: a connector 32 mounted on the first substrate 311; and a coupling part 33 mounted on the third plate 3123 and connected to the connector 32.

According to yet another embodiment of the present disclosure, the second substrate 312 may include a plurality of second substrates 312 coupled to each of a first side and a second side of the first substrate 311, the plurality of second substrates 312 being spaced apart from each other along the first side and the second side of the first substrate 311.

According to yet another embodiment of the present disclosure, widths w1 and w2 of the first plate 3121 and the second plate 3122 in the longitudinal direction of the first substrate 31 may be equal to each other, and a separation distance d2 between the first plate 3121 and the second plate 3122 may be equal to the width w1 of the first plate 3121.

According to yet another embodiment of the present disclosure, widths w1 and w2 of the first plate 3121 and the second plate 3122 in the longitudinal direction of the first substrate 31 may be equal to each other, and a separation distance d1 between the first plate 3121 and the second plate 3122 may be equal to twice the width w1 of the first plate 3121.

According to yet another embodiment of the present disclosure, the first plate 3121, the second plate 3122, and the third plate 3123 may be formed as one body.

According to yet another embodiment of the present disclosure, the plurality of light sources 34 may include a plurality of first light sources 34 which are mounted on the first plate 3121, and are spaced apart from each other in the longitudinal direction of the first plate 3121; and a plurality of second light sources 34 which are mounted on the second plate 3122, and are spaced apart from each other in a longitudinal direction of the second plate 3122, wherein some of the plurality of first light sources 34 and some of the plurality of second light sources 34 may form a local dimming block.

According to yet another embodiment of the present disclosure, the frame 70 may include first to fourth sides that are adjacent to each other, wherein the first substrate 311 may be elongated from the first side of the frame 70 to the third side of the frame 70, and the first plate 3121 may be elongated from the first side of the first substrate 311 or a second side of the first substrate 311 toward the second side or the fourth side of the frame 70.

According to yet another embodiment of the present disclosure, the frame 70 may include a plurality of regions 70A1, 70A2, 70A3, 70A4, 70A5, 70A6, 70A7, 70A8, and 70A9, wherein the substrate 31 may include a plurality of substrates 31a, 31b, 31c, 31d, 31e, 31f, 31g, 31h, and 31i that are coupled to the plurality of regions 70A1, 70A2, 70A3, 70A4, 70A5, 70A6, 70A7, 70A8, and 70A9, respectively, wherein the plurality of substrates 31a, 31b, 31c, 31d, 31e, 31f, 31g, 31h, and 31i may have a same shape.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

What is claimed is:

1. A display device comprising:
a display panel;
a frame coupled to the display panel;
a substrate disposed between the display panel and the frame and coupled to the frame;
a plurality of light sources mounted on the substrate; and
a reflective sheet disposed on the substrate and having a hole through which the plurality of light sources passes,
wherein the substrate comprises:
a first substrate which is elongated;
a second substrate which is electrically connected to a first side of the first substrate; and
a third substrate which is electrically connected to a second side of the first substrate opposite to the first side of the first substrate,
wherein each of the second substrate and the third substrate comprises:
a first plate extending in a direction intersecting a longitudinal direction of the first substrate;
a second plate that is parallel to the first plate and that is spaced apart from the first plate; and
a third plate connecting the first plate and the second plate and electrically-connected to the first substrate.

2. The display device of claim 1, wherein the plurality of light sources are mounted on the first plate and the second plate, and are spaced apart from each other in a longitudinal direction of each of the first plate and the second plate.

3. The display device of claim 2, further comprising a plurality of lenses fixed to the substrate and covering respective ones of the plurality of light sources,
wherein each of the plurality of lenses have a diameter equal to or smaller than widths of the first plate and the second plate in a longitudinal direction of the first substrate.

4. The display device of claim 1, wherein the plurality of light sources comprises:
a plurality of first light sources which are mounted on the first plate, and are spaced apart from each other in the longitudinal direction of the first plate; and
a plurality of second light sources which are mounted on the second plate, and are spaced apart from each other in a longitudinal direction of the second plate,
wherein some of the plurality of first light sources and some of the plurality of second light sources form a local dimming block.

5. The display device of claim 1, further comprising:
a connector mounted on the first substrate;
a first coupling part mounted on the third plate of the second substrate and connected to the connector; and
a second coupling part mounted on the third plate of the third substrate and connected to the connector.

6. The display device of claim 5, wherein the frame comprises first to fourth sides that are adjacent to each other,
wherein the first substrate is elongated from the first side of the frame to the third side of the frame, and the first plate is elongated from the first side of the first substrate or a second side of the first substrate toward the second side or the fourth side of the frame.

7. The display device of claim 1,
wherein the second substrate comprises a plurality of second substrates that are spaced apart from each other along the first side and of the first substrate, and
wherein the third substrate comprises a plurality of third substrates being spaced apart from each other along the second side of the first substrate.

8. The display device of claim 1, wherein widths of the first plate and the second plate in the longitudinal direction of the first substrate are equal to each other, and a separation distance between the first plate and the second plate is equal to the width of the first plate.

9. The display device of claim 1, wherein widths of the first plate and the second plate in the longitudinal direction of the first substrate are equal to each other, and a separation distance between the first plate and the second plate is equal to twice the width of the first plate.

10. The display device of claim 1, wherein the first plate, the second plate, and the third plate are formed as one body.

11. The display device of claim 1, wherein the frame comprises a plurality of regions, wherein the substrate comprises a plurality of substrates that are coupled to the plurality of regions, respectively, wherein the plurality of substrates have a same shape.

\*　\*　\*　\*　\*